Dec. 15, 1942.　　　T. G. WALKER　　　2,305,119
SWEEP RAKE
Filed May 15, 1941　　　3 Sheets-Sheet 1

Thomas G. Walker
INVENTOR

BY Victor J. Evans & Co.
ATTORNEYS

Dec. 15, 1942. T. G. WALKER 2,305,119
SWEEP RAKE
Filed May 15, 1941 3 Sheets-Sheet 2
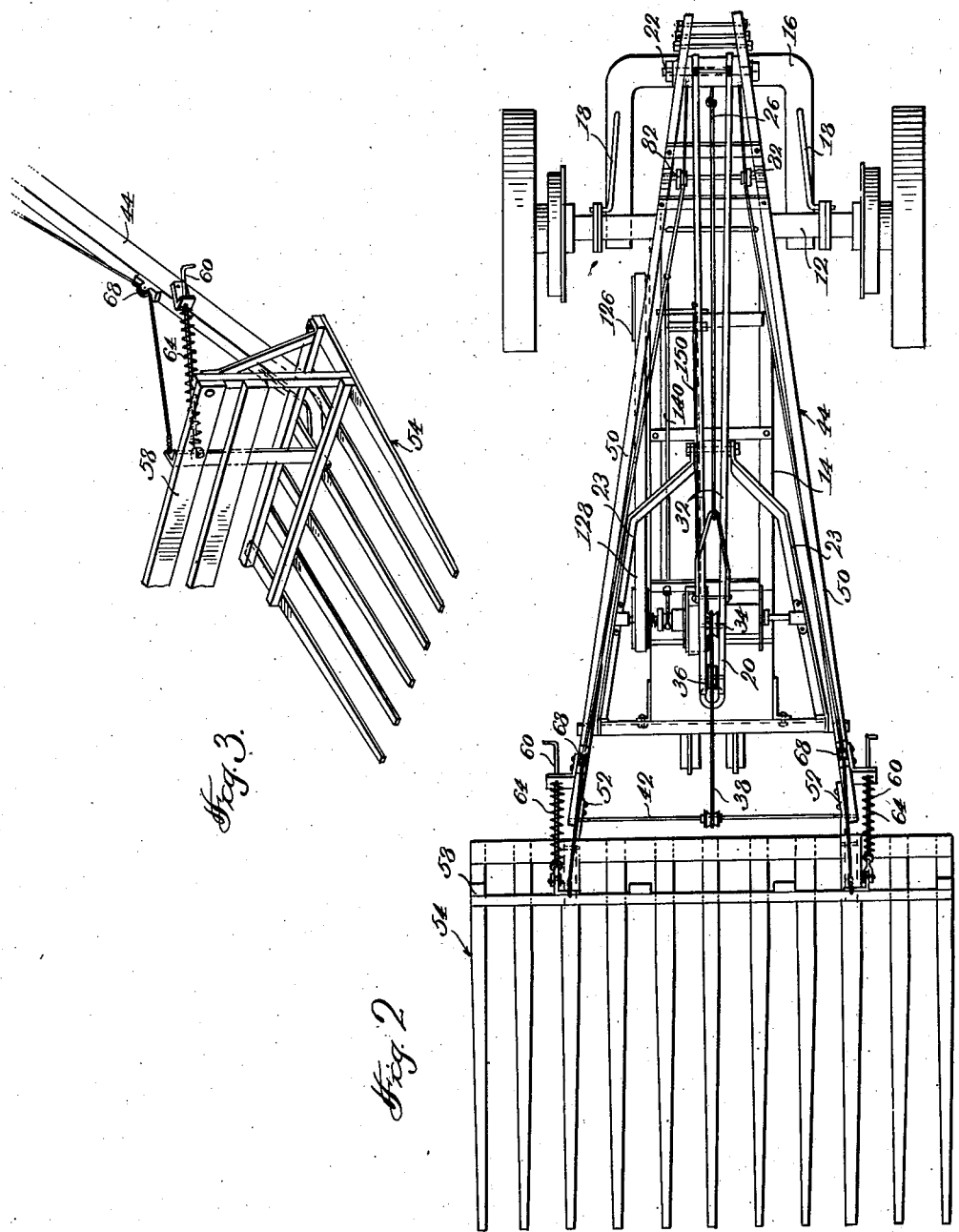
Thomas G. Walker INVENTOR
BY Victor J. Evans & Co.
ATTORNEYS Dec. 15, 1942.　　T. G. WALKER　　2,305,119
SWEEP RAKE
Filed May 15, 1941　　3 Sheets-Sheet 3
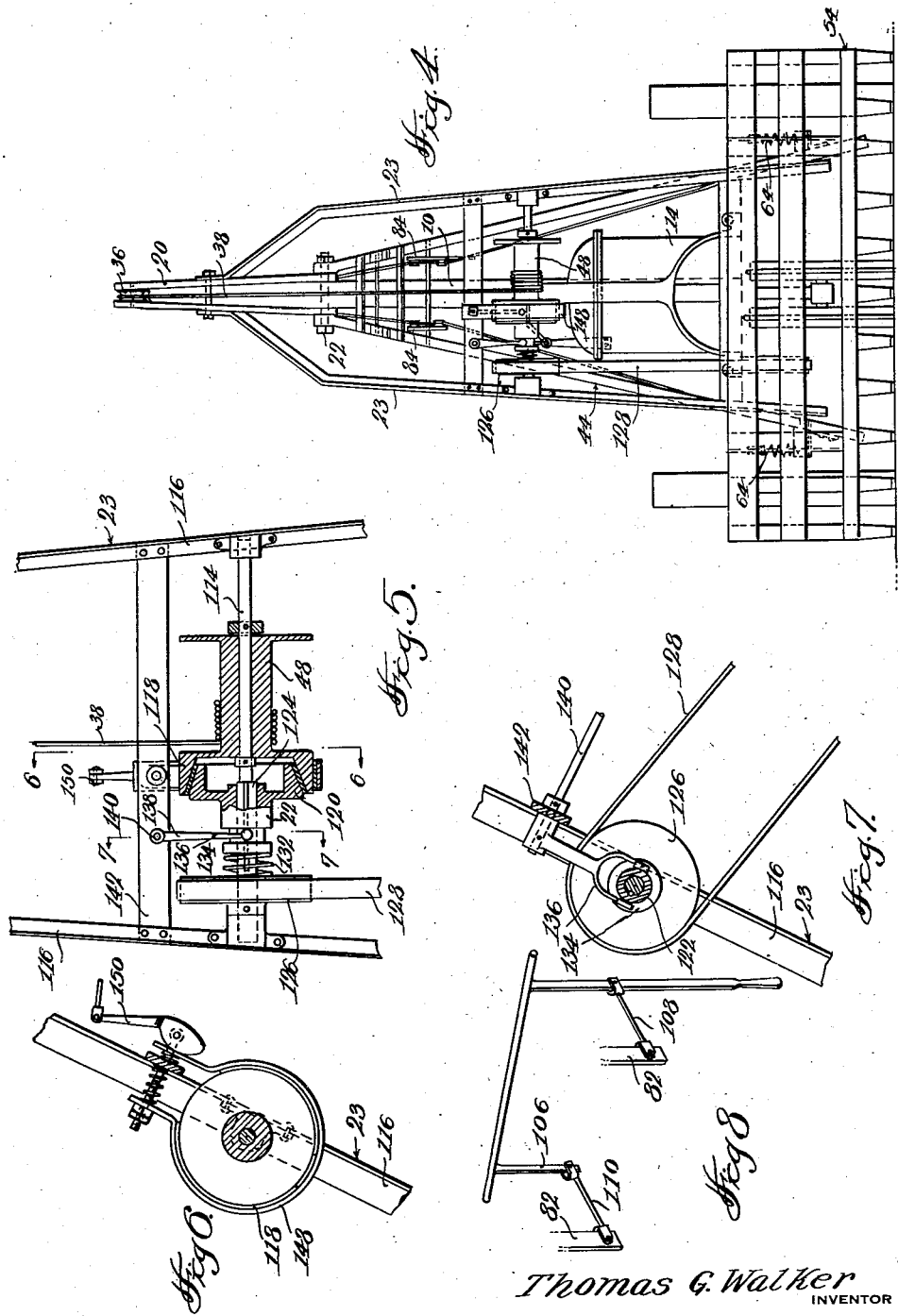
Thomas G. Walker
INVENTOR
BY Victor J. Evans & Co.
ATTORNEYS Patented Dec. 15, 1942

2,305,119

UNITED STATES PATENT OFFICE 2,305,119

SWEEP RAKE

Thomas G. Walker, Nishnabotna, Mo., assignor of one-half to Geo. W. Boettner, Joyce R. Bailey, and Geo. I. Beasing, all of Atchison County, Mo.

Application May 15, 1941, Serial No. 393,627

2 Claims. (Cl. 214—140)

My invention relates to improvements in hay handling devices in which a vertically movable sweep rake is operated in conjunction with a power device, such as a tractor, and the objects of my improvement are; first, to provide a sweep rake and tractor combination wherein the sweep rake and its load are distributed and supported in such manner on the tractor as to effectively balance the sweep rake structure and its load on the tractor; second, to provide a sweep rake unit having such flexibility as to operate efficiently on flat as well as uneven fields; third, to afford facilities for quick and easy attachment of the sweep rake structure to the tractor; and fourth, to provide a sweep rake structure incorporating efficient and conveniently arranged manual controls within easy reach of the operator of the tractor.

In the accompanying drawings:

Figure 2 is a top plan view;

Figure 3 is a perspective view of the sweep rake unit;

Figure 4 is a front elevational view;

Figure 5 is a sectional view of a hoist drum and clutch unit;

Figure 6 is a view taken from the position indicated by line 6—6 of Figure 5;

Figure 7 is a view taken from the position indicated by line 7—7 of Figure 5; and Figure 8 is a perspective view of a sweep rake actuating lever.

Figure 1:
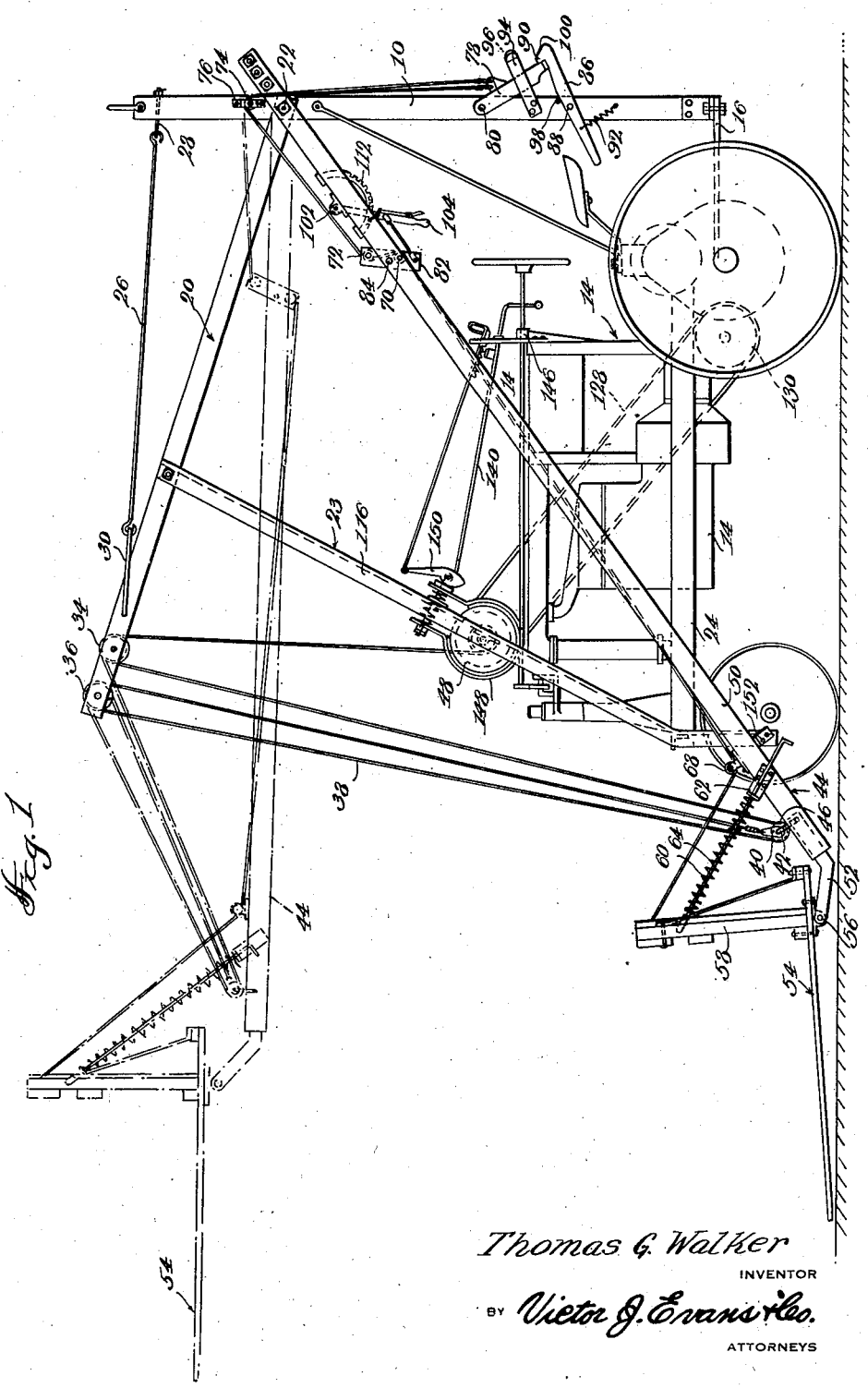
Figure 1 is a side elevational view of a tractor illustrating my invention applied thereto.

In the embodiment selected to illustrate the invention, an upright post 10 is fixedly secured to the axle housing 12 of the tractor 14 through the medium of a bracket 16 fixed to the axle housing, this bracket being additionally supported by brace arms 18 interconnecting the bracket and the axle housing. A beam 20 has one end secured to the post 10 by a bolt 22, which bolted connection is located a short distance downwardly of the upper end of the post 10 so as to provide ample head room for the operator of the tractor, in addition to securing the necessary elevation of the sweep rake structure associated with the beam. This beam inclines upwardly from the post 10 and is supported by a frame 23 inclined slightly to the vertical and secured to the forward end of the tractor frame 24.

Additional support is afforded for the beam 20 through the medium of a tie rod 26 having one end connected with an eye bolt 28 anchored to the post 10 and its other end connected with a bail 30 anchored to the beam 20 closely adjacent its forward end. This beam is preferably made up of two members 32 fixedly united in spaced relationship, as in Figure 2, with the members embracing opposite sides of the post 10. Adjacent the forward ends of the members 32 and located therebetween are two grooved wheels 34 and 36.

A sweep rake control line 38 passes over the wheel 36 and has one end connected with a coupling 40 mounted on a bowed bar 42 anchored to a hoist frame 44. The line 38 passes around a grooved wheel 46 rotatably carried by the coupling 40 and then passes upwardly around the wheel 34 and downwardly for connection with a hoist drum 48. Frame 44 comprises two beams 50 converging rearwardly of the tractor and inclined upwardly for pivotal connection with the bolt 22. To the forward ends of the beam 50 are fixedly connected arms 52 having a sweep rake unit 54 pivotally connected therewith, as at 56. To the upright backing 58 of the sweep rake 54 is connected two rods 60 slidably guided in brackets 62 secured to the beams 50. Compression springs 64 are mounted on the rods 60 in abutting engagement with the bracket 62 for yieldingly urging the sweep rake into engagement with the field surface.

To the upper end of the backing 58 are connected two lines 66 which pass downwardly underneath grooved wheels 68 rotatably mounted on the respective beams 50. Each line 66 passes upwardly along one of the beams 50, rearwardly around a grooved wheel 70, forwardly around a grooved wheel 72, over a grooved wheel 74 rotatably supported by a bracket 76 fastened to the post 10, and downwardly for connection with an arm 78 pivoted at 80 to the post 10. A plate 82 is pivoted intermediate its ends at 84 to each of the beams 50, and the wheels 70 and 72 of each pair are rotatably mounted on one of the plates 82.

A trip lever 86 is pivoted at 88 on the post 10 and is provided with a hook 90 having hooked engagement with the arm 78. A tension spring 92 has one end connected with the post 10 and its opposite end connected with the trip lever 86 for biasing the lever into engagement with the arm 78. The arm 78 may be released by imparting clockwise rotation to the trip lever 86, as when viewing Figure 1. An arm 94 is bolted to the post 10 and is provided with a hook 96 arranged in the path of the arm 78 to limit its pivotal movement when released by the trip lever 86. A stop pin 98 is secured to the post 10 and arranged in the path of the trip lever 86 to limit its counter-clockwise rotation after release of the arm 78, and the trip lever is rounded at 100 so as to be cammed to one side when the arm 78 is pivoted to its normal position of Figure 1.

A shaft 102 is rotatably mounted on the beam 50 transversely thereof, which shaft is provided with a lever 104, see Figure 8, and an arm 106. A link 108 is pivotally connected at one end with the lever 104 and at its other end with one of the plates 82, while a link 110 is pivotally connected at one end with the arm 106 and at its other end with the other plate 82. In Figure 1, a quadrant 112 is secured to one of the beams 50 so that the lever 104 may be latched in different positions. Pivotal movement of the lever 104 imparts pivotal motion to the plates 82 for lengthening and shortening the lines 66, so that pivotal adjustment of the sweep rake 54 is secured through manipulation of the lever 104 located within easy reach of the operator of the tractor.

In Figure 5, the hoist drum 48 is mounted on a supporting shaft 114 secured to the members 116 of the frame 23. One end of the hoist drum is provided with a clutch flange 118 engageable by a clutch part 120 located inside the flange and provided with a hub 122 having a splined connection with the increased diameter length 124 of the shaft 114. A pulley 126 is keyed to the length 124 and is driven by a belt 128 passing around the drive pulley 130 of the tractor, as illustrated in Figure 1.

A compression spring 132 is interposed between the pulley 126 and the hub 122 for urging the clutch part 120 into engagement with the flange 118. This hub is provided with a circumferential groove 134 for the reception of the forked end 136 of an arm 138 connected with a shaft 140 rotatably supported at one end by a brace 142 secured to the members 116 and at its other end by a bracket 144 extending upwardly from the steering rod support 146 of the tractor. The rod 140 is accessible from the operator's position on the tractor, and the clutch member 120 is moved to a declutching position by counterwise rotation of the rod 140 when viewed from the operator's position on the tractor.

A brake band 148 encircles the flange 118 for braking engagement with its outer peripheral face, and the brake band is actuated through the medium of a linkage 150 accessible from the operator's position.

In operation, the sweep rake 54 is of conventional construction. After loading, the sweep rake is pivoted sufficiently far in a clockwise direction, when viewing Figure 1, to effectively support the load on the sweep rake. Such adjustment is accomplished through manipulation of the lever 104 with the arm 78 latched in the position of Figure 1.

The frame 44 is then elevated to the dotted line position of Figure 1, through manipulation of the clutch mechanism, assuming that the load is to be dumped from a high elevation. With the load located vertically at the unloading station, the trip lever 86 is pivoted out of a holding engagement with the arm 78, which permits the sweep rake to pivot downwardly and dump its load.

The frame 44 is sufficiently wide to clear the sides of the front end of the tractor, and the sweep rake 54 is of such width as to pass easily through ordinary gates, in addition to being easily maneuvered in confined places. Effective support of the overhead structure is secured by reason of the fact that the post 10 connects with the rear end of the tractor and the frame 23 connects with its forward end. The members 116 of the frame 23 are extended downwardly and are provided with brackets 152 which afford rests for the beams 50 in their lowered and normal operating positions.

Without further elaboration, the foregoing will so fully illustrate my invention, that others may, by applying current knowledge, readily adapt the same for use under various conditions of service.

I claim:

1. In combination with a tractor, an upright member secured to the rear end of the tractor, a hoist beam having one end secured to said upright member and extending longitudinally of the tractor thereabove, a brace between the forward end of the tractor and said hoist beam, a sweep rake located forwardly of the tractor, a sweep rake frame having one end pivotally connected with said upright member, means pivotally connecting the other end of said sweep rake frame with the sweep rake, a hoist line connected with said sweep rake frame and supported by said hoist beam, said tractor having a power take-off, a hoist drum mounted on said brace and operatively connected with said hoist line, a clutch means operatively connecting said hoist drum and said power take-off for pivoting said sweep rake frame to raise and lower the sweep rake, resilient means acting on said sweep rake and said sweep rake frame for yieldingly holding the sweep rake in engagement with the field, a control line connected with said sweep rake for imparting pivotal movement thereto, a trip means connected with said upright member and said control line, and a lever actuated means pivotally mounted on said sweep rake frame for looping said control line to impart pivotal movement to the sweep rake.

2. In combination with a tractor, an upright member secured to the rear end of the tractor, a hoist beam having one end secured to said upright member and extending longitudinally of the tractor thereabove, a brace between the forward end of the tractor and said hoist beam, a sweep rake located forwardly of the tractor, a sweep rake frame having one end pivotally connected with said upright member, means pivotally connecting the other end of said sweep rake frame with the sweep rake, a hoist line connected with said sweep rake frame and supported by said hoist beam, said tractor having a power take-off, a hoist drum mounted on said brace and operatively connected with said hoist line, a clutch means operatively connecting said hoist drum and said power take-off for pivoting said sweep rake frame to raise and lower the sweep rake, control lines connected with said sweep rake, a trip means mounted on said upright member and connected with said control lines, and lever actuated means pivotally mounted on said sweep rake frame for looping said control lines to impart pivotal movement to the sweep rake, said lever actuated means including spaced grooved wheels acting on the respective control lines.

THOMAS G. WALKER.